United States Patent
Ma

(10) Patent No.: US 9,085,338 B2
(45) Date of Patent: Jul. 21, 2015

(54) BICYCLE EXPANDER

(71) Applicant: Shimano (Singapoe) Pte. Ltd., Jurong Town (SG)

(72) Inventor: Yun Ma, Jurong Town (SG)

(73) Assignee: Shimano (Singapore) PTE LTD., Jurong Town (SG)

( * ) Notice: Subject to any disclaimer, the term of this patent is extended or adjusted under 35 U.S.C. 154(b) by 98 days.

(21) Appl. No.: 13/724,666

(22) Filed: Dec. 21, 2012

(65) Prior Publication Data

US 2014/0178146 A1    Jun. 26, 2014

(51) Int. Cl.
*B62K 21/24*  (2006.01)
*F16B 7/04*   (2006.01)
*F16B 7/02*   (2006.01)

(52) U.S. Cl.
CPC .............. *B62K 21/24* (2013.01); *F16B 7/0413* (2013.01); *F16B 7/025* (2013.01)

(58) Field of Classification Search
USPC ........... 411/24–28; 280/279; 74/555.1, 55.11; 403/370
See application file for complete search history.

(56) References Cited

U.S. PATENT DOCUMENTS

| 1,038,834 | A | * | 9/1912 | Bloom | 411/24 |
| 1,753,183 | A | * | 4/1930 | Johnson | 16/39 |
| 5,536,104 | A |   | 7/1996 | Chen |  |
| 5,540,457 | A | * | 7/1996 | Johnson | 280/279 |
| 5,605,075 | A | * | 2/1997 | Chi | 74/551.1 |
| 7,645,087 | B1 |  | 1/2010 | Lin |  |
| 7,815,206 | B2 | * | 10/2010 | Tseng | 280/279 |

* cited by examiner

*Primary Examiner* — Flemming Saether
(74) *Attorney, Agent, or Firm* — Global IP Counselors

(57) ABSTRACT

A bicycle expander basically includes an expander body, an expanding structure and a positioning shoulder. The expander body has a cylindrical shape and being capable of varying an effective diameter thereof. The expanding structure is operatively connected to the expander body to vary the effective diameter of the expander body. The positioning shoulder extends from an axial end portion of the expander body, the positioning shoulder including an abutment protruding a radially outward direction with respect to the expander body.

15 Claims, 16 Drawing Sheets

BICYCLE EXPANDER

BACKGROUND

1. Field of the Invention

This invention generally relates to a bicycle expander. More specifically, the present invention relates to a bicycle expander that is configured to be secured in a tubular part of a bicycle.

2. Background Information

A bicycle headset is a set of components on a bicycle that provides a rotatable interface between a steerer tube of a bicycle fork and a head tube of a bicycle frame. A typical headset has two opposed cups that are pressed into a top of the head tube and bottom into a bottom of the head tube. Inside the two cups are bearings which provide a low friction contact between the bearing cup and the steerer. Basically, there are two main types of headset, which distinguishable by the way in which the bearings are held in place. The first type is often called a threaded headset, which is used with a threaded steerer tube. The second type is often called a threadless headset, which is used with a threadless steerer tube. With a threadless headset, a star-nut is driven down into the threadless steerer tube and held in place by barbed flanges. Then a top cap bolt is threaded into the star-nut, which pulls against the star-nut, to preload the headset bearings. More recently, the star-nut has been replaced with an expander.

SUMMARY

Generally, the present disclosure is directed to various features of a bicycle expander. One feature presented in the present disclosure is a bicycle expander that can be easily used with steerer tubes of various inner diameters.

In view of the state of the known technology, a bicycle expander is basically provided that comprises an expander body, an expanding structure and a positioning shoulder. The expander body has a cylindrical shape and being capable of varying an effective diameter thereof. The expanding structure is operatively connected to the expander body to vary the effective diameter of the expander body. The positioning shoulder extends from an axial end portion of the expander body, the positioning shoulder including an abutment protruding a radially outward direction with respect to the expander body.

Other objects, features, aspects and advantages of the disclosed bicycle expander will become apparent to those skilled in the art from the following detailed description, which, taken in conjunction with the annexed drawings, discloses preferred embodiments of the bicycle expander

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
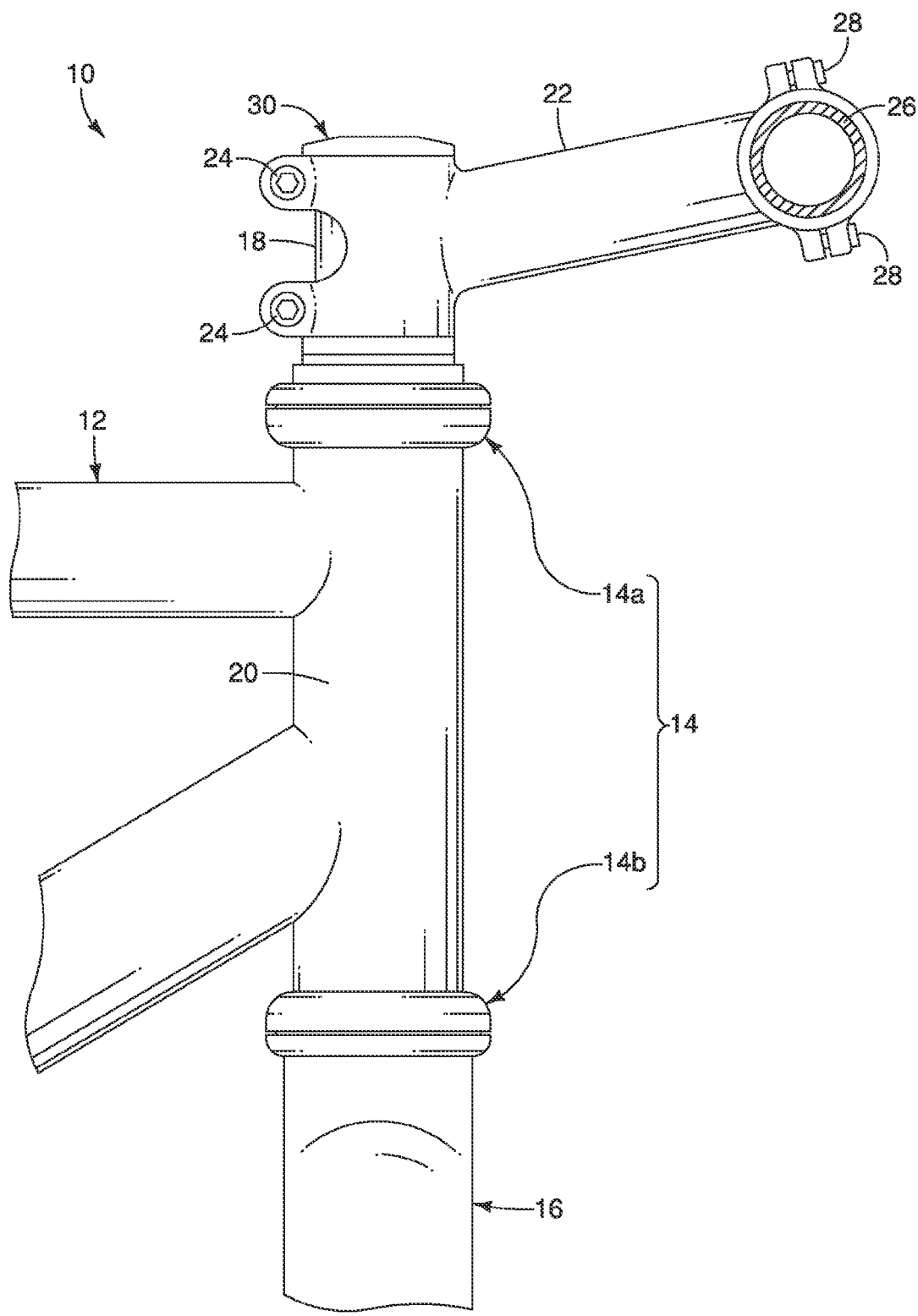
FIG. 1 is a partial side elevational view of a bicycle that is equipped with a bicycle headset that uses a bicycle expander in accordance with a first embodiment.

Referring initially to FIG. 1, a front portion of a bicycle 10 is illustrated that has a bicycle frame 12 with a bicycle headset 14 that rotatably supports a front fork 16 in accordance with a first embodiment. The bicycle headset 14 rotatably supports a steerer tube 18 of the front fork 16 to a head tube 20 of the bicycle frame 12 about a rotational axis of the bicycle headset 14. The bicycle headset 14 includes an upper bearing assembly 14a and a lower bearing assembly 14b. The steerer tube 18 extends through the upper and lower bearing assemblies 14a and 14b, and through the head tube 20 of the bicycle frame 12. A handlebar stem 22 is attached to an upper end portion of the steerer tube 18 to rotatably secure the front fork 16 to the head tube 20 of the bicycle frame 12. Specifically, the handlebar stem 22 is secured to the steerer tube 18 by a pair of bolts 24 such that the upper bearing assembly 14a is sandwiched between a bottom end of the handlebar stem 22 and a top end of the head tube 20. On the other hand, the lower bearing assembly 14b is sandwiched between a bottom end of the head tube 20 and a fork crown of the front fork 16. The handlebar stem 22 also releasably secures a handlebar 26 in a conventional manner (e.g., a pair of bolts 28). Since the upper and lower bearing assemblies 14a and 14b and the handlebar stem 22 are a conversional bicycle parts, the upper and lower bearing assemblies 14a and 14b and the handlebar stem 22 will not be discussed in detail herein.

Figure 2:
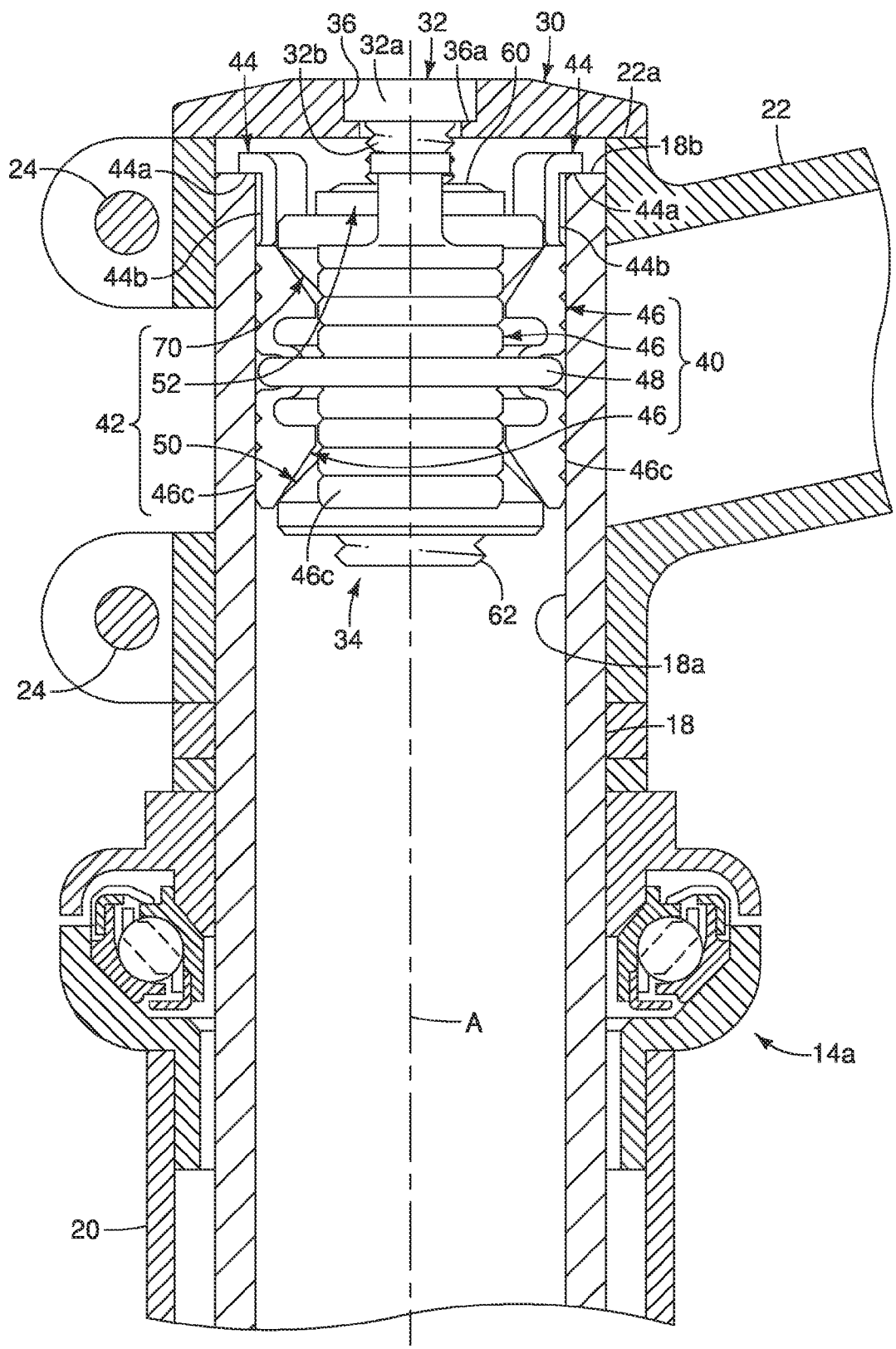
FIG. 2 is a partial longitudinal cross sectional view of the portion of the bicycle illustrated in FIG. 1 with the bicycle expander and the top cap bolt shown in elevational.
Figure 3:
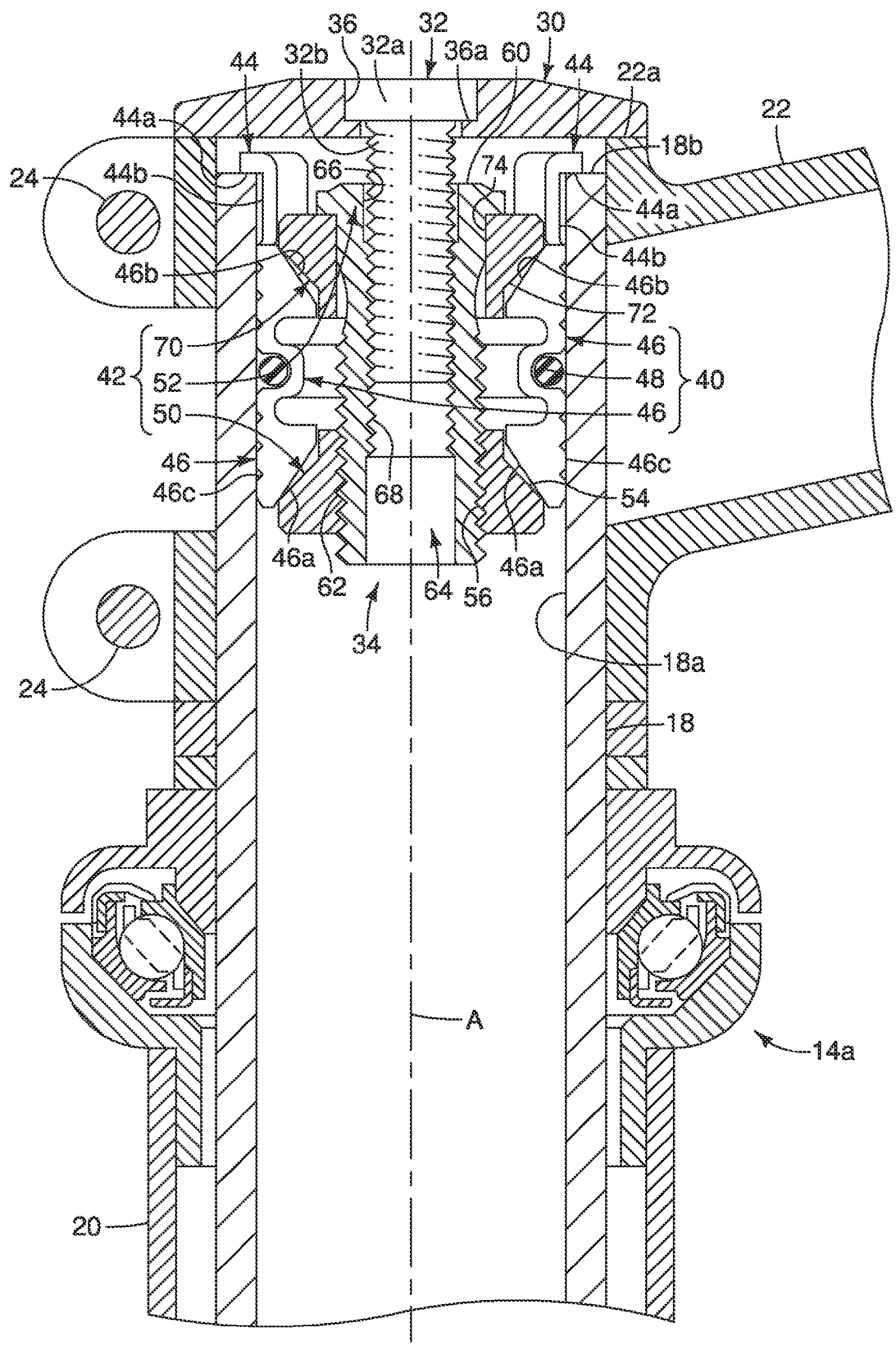
FIG. 3 is another partial longitudinal cross sectional view of the portion of the bicycle illustrated in FIG. 1 with the bicycle expander shown in cross section.

Referring now to FIGS. 2 and 3, the bicycle headset 14 further includes a top cap 30, a top cap bolt 32 and a bicycle expander 34 (hereinafter expander). Thus, the bicycle headset 14 is a so-called threadless-type headset. As discussed below, the expander 34 is designed to be anchored inside the steerer tube 18 by a part or parts of the expander 34 expanding radially outward with respect to a center longitudinal axis A of the expander 34. The center longitudinal axis A of the expander 34 is aligned with a center longitudinal axis of the steerer tube 18 when the expander 34 is secured within the steerer tube 18. As discussed below, the expander 34 is used to maintain an axial position of the handlebar stem 22 relative to the steerer tube 18.

As seen in FIG. 2, the top cap 30 is hard rigid disc with a bore 36 for receiving the top cap bolt 32 therethrough. The bore 36 is preferably a step shaped and defines an abutment 36a. The top cap 30 can be made of any suitable material such as a hard rigid plastic material, a fiber reinforced resin or a metallic material. The top cap 30 is dimensioned to contact an upper edge 22a of the handlebar stem 22. When the top cap bolt 32 is threaded into the expander 34, the top cap bolt 32 applies a downward force on the abutment 36a of the top cap bolt 32. This downward force on the top cap bolt 32 applies a downward force on the upper edge 22a of the handlebar stem 22 to load the upper and lower bearing assemblies 14a and 14b. The top cap 30 is a relatively conventional part, and thus, the top cap 30 will not be discussed in further detail.

As seen in FIG. 3, the top cap bolt 32 has a head 32a and an externally threaded shaft 32b. The top cap bolt 32 is a relatively conventional part, and thus, the top cap bolt 32 will only be briefly discussed. In the assembled condition, the head 32a is disposed in the upper portion of the bore 36 and contacts the abutment 36a. The shaft 32b is threaded into an upper end of the expander 34 to vary the effective diameter of the expander 34. In this way, the expander 34 is releasably secured to inside the steerer tube 18. Thus, the expander 34 provides an anchor point inside the steerer tube 18 such that the top cap bolt 32 applies a downward force on the upper edge 22a of the handlebar stem 22 to load the upper and lower bearing assemblies 14a and 14b. As a result, the expander 34 maintains an axial position of the handlebar stem 22 relative to the steerer tube 18.

Now, the expander 34 will be discussed in further detail. In this first embodiment, the expander 34 basically includes an expander body 40 and an expanding structure 42. Basically, the expanding structure 42 is operatively connected to the expander body 40 to vary the effective diameter of the expander body 40. By varying the effective diameter of the expander body 40, the expander body 40 engages an interior surface 18a (i.e., an inner circumferential surface) of the steerer tube 18. Thus, the expander 34 is secured to the interior surface 18a of the steerer tube 18.

The expander 34 includes a positioning shoulder 44. As explained below, the positioning shoulder 44 extends from an axial end portion of the expander body 40 for locating the expander 34 within the steerer tube 18. In particular, the positioning shoulder 44 engages an upper edge 18b of the steerer tube 18 to locate the expander body 40 within the steerer tube 18 prior to the expander body 40 being expanded to securely engage the interior surface 18a of the steerer tube 18. In this way, the expander 34 can be easily installed in the steerer tube 18, because the positioning shoulder 44 engages the upper edge 18b of the steerer tube 18 to hold the expander 34 in position while the expander 34 is being expanded against the interior surface 18a of the steerer tube 18.

In this first embodiment, the expander body 40 preferably further includes three wedge blocks 46. The expander body 40 further preferably includes an elastic band 48 biasing the wedge blocks 46 toward a radially inward direction of the expander body 40.

The wedge block 46 and the elastic band 48 of the expander body 40 are arranged such that the expander body 40 is capable of varying an effective diameter thereof as explained below. Preferably, each of the wedge blocks 46 includes a first or lower expansion surface 46a, a second or upper expansion surface 46b and an outer peripheral surface 46c. The outer peripheral surface 46c is a curved arc shaped surface having a plurality of first tube contact areas. The outer peripheral surface 46c has a plurality of circumferentially extending grooves to provide a good gripping surface for engaging the interior surface 18a of the steerer tube 18 when the outer peripheral surfaces 46c are pressed against the interior surface 18a of the steerer tube 18 during installation of the expander 34 in the steerer tube 18. Of course, if needed and/or desired, the outer peripheral surfaces 46c can be formed without such grooves. In this first embodiment, the first and second expansion surfaces 46a and 46b are partial conical surfaces (i.e., inclined curved surfaces). The first and second expansion surfaces 46a and 46b are inclined toward the center longitudinal axis A of the expander 34 as they extend from a corresponding axial end of the wedge block 46 toward the middle of the wedge block 46. The first and second expansion surfaces 46a and 46b cooperate with the expanding structure 42 to vary the effective diameter of the expander body 40 as discussed below.

Here, in this first embodiment, each of the wedge blocks 46 is connected to the positioning shoulder 44. It will be apparent from this disclosure that only some of the wedge blocks 46 may be connected to the positioning shoulder 44. Also it will be apparent from this disclosure that the expander body 40 could be a single split ring or could be made of two or more of the wedge blocks 46. Also while the wedge blocks 46 are separate members coupled together by the elastic band 48 such that the expander body 40 has a cylindrical shape, the elastic band 48 could be integrally formed with the wedge blocks 46. For example, the wedge blocks 46 could be molded onto the elastic band 48 to form an integrated unit.

In this first embodiment, the positioning shoulder 44 includes a plurality of abutments 44a protruding a radially outward direction with respect to each of the wedge blocks 46 of the expander body 40. Preferably, the positioning shoulder 44 is further includes a plurality of connecting portions 44b connecting the abutments 44a with each of the wedge blocks 46 of the expander body 40. The connecting portions 44b extend to parallel to an axial direction of the expander body 40, while the abutment 44a extend to perpendicular to an axial direction of the expander body 40. Basically, the length of the connecting portion 44b determines the location of the expander body 40 will engage the interior surface 18a of the steerer tube 18. Thus, by making the connecting portion 44b of each of the wedge blocks 46 longer or shorter, the expander body 40 can be located farther or closer to the upper edge 18b of the steerer tube 18 as needed and/or desired.

Here, in this first embodiment, the expanding structure 42 basically includes a first pressure member 50 and a second pressure member 52. The second pressure member 52 moves with respect to the first pressure member 50 to vary the effective diameter of the expander body 40. More specifically, the first and second pressure members 50 and 52 get closer to each other to expand the effective diameter of the expander body 40 by moving the wedge blocks 46 radially outward with respect to the center longitudinal axis of the expander 34. Also the first and second pressure members 50 and 52 get farther to each other to contract the effective diameter of the expander body 40 by moving the wedge blocks 46 radially inward with respect to the center longitudinal axis of the expander 34.

In this first embodiment, the first pressure member 50 is preferably provided as a pressure nut, and the second pressure member 52 is preferably provided as a pressure bolt. The first pressure member 50 has a first expansion surface 54 and a threaded hole 56. The second pressure member 52 has a head 60, an externally threaded shaft 62 and a longitudinally extending bore 64. Basically, the externally threaded shaft 62 of the second pressure member 52 is screwed into the threaded hole 56 of the first pressure member 50 (i.e., the pressure nut). As a result of this screwing action between the first and second pressure members 50 and 52, the first expansion surface 54 of the first pressure member 50 is engaged with the wedge blocks 46 of the expander body 40 to vary the effective diameter of the expander body 40.

Figure 4:
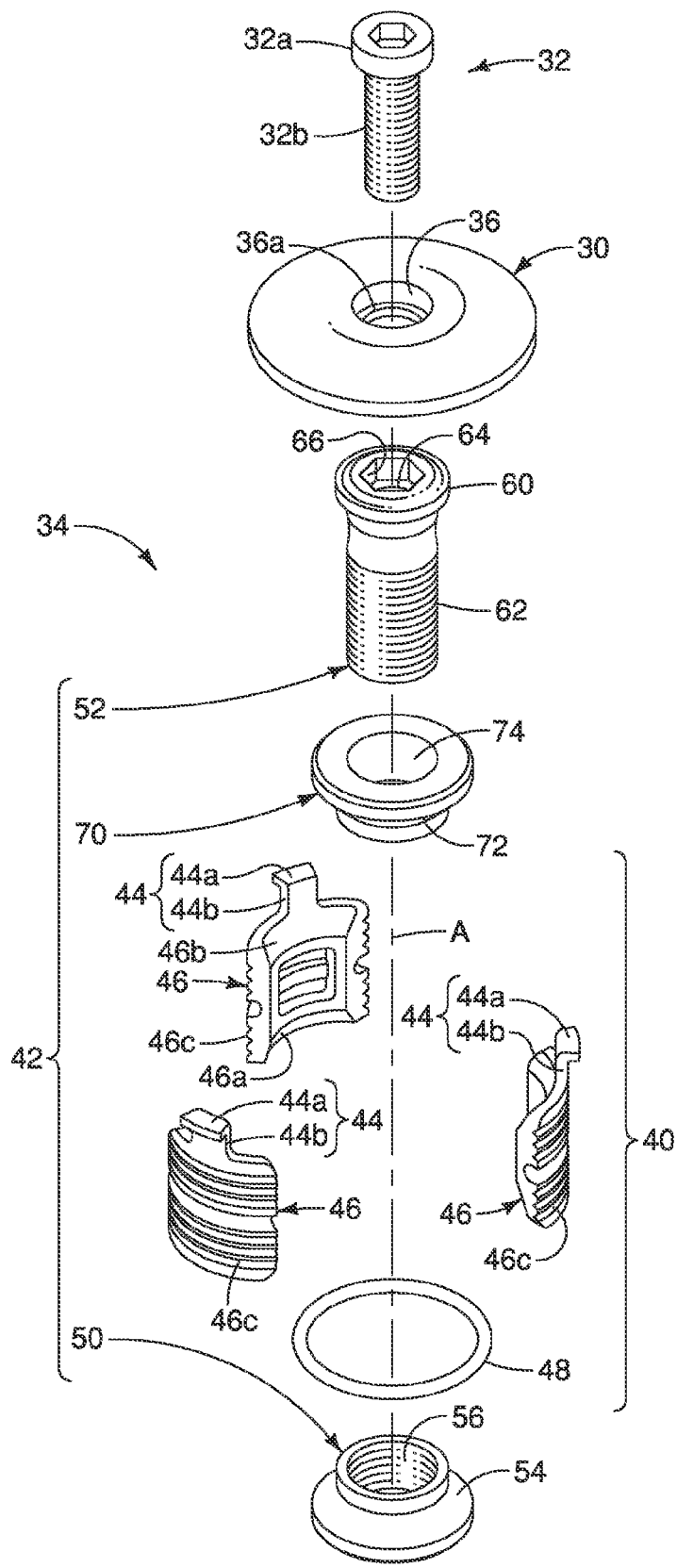
FIG. 4 is an exploded perspective view of the top cap bolt and the bicycle expander illustrated in FIGS. 2 and 3.
Figure 5:
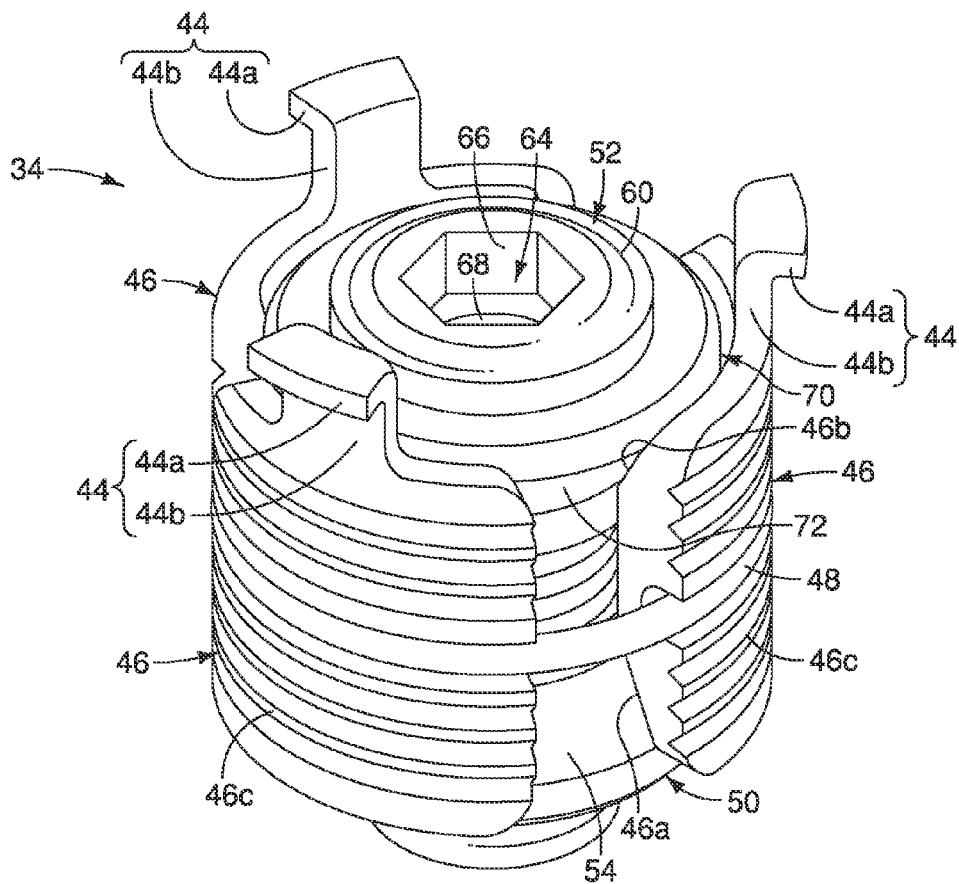
FIG. 5 is a perspective view of the bicycle expander illustrated in FIGS. 2 to 4.

In this first embodiment, the first expansion surface 54 is a conical surface. The first expansion surface 54 is inclined toward the center longitudinal axis A of the expander 34 as the first expansion surface 54 extends upward from a bottom axial end of the first pressure member 50 as seen in FIGS. 3 and 4. The first expansion surface 54 engages the first (lower) expansion surfaces 46a of the wedge blocks 46 to vary the effective diameter of the expander body 40. In particular, as the second pressure member 52 (i.e., the pressure bolt) is tightened, such that the first pressure member 50 (i.e., the pressure nut) moves up the externally threaded shaft 62 of the second pressure member 52, the first expansion surface 54 contacts the first (lower) expansion surfaces 46a of the wedge blocks 46 to push the wedge blocks 46 radially outward against the interior surface 18a of the steerer tube 18.

As seen in FIGS. 3 and 4, the longitudinally extending bore 64 includes a tool engagement portion 66 and an internally threaded portion 68. As seen in FIG. 4, the tool engagement portion 66 is illustrated as a hexagonally shaped bore. However, the tool engagement portion 66 can have other configurations. The internally threaded portion 68 threadedly receives the top cap bolt 32 once the expander 34 is securely anchored against the interior surface 18a of the steerer tube 18. In this way, the expander 34 acts as a nut for the top cap bolt 32 such that the top cap 30 can apply a downward force on the handlebar stem 22 to load the upper and lower bearing assemblies 14a and 14b.

Also, in this first embodiment, the expanding structure 42 preferably further includes a pressure washer 70 (i.e., a third pressure member). The pressure washer 70 is slidably disposed on the externally threaded shaft 62 of the second pressure member 52 (i.e., the pressure bolt) between the head 60 of the second pressure member 52 and the first pressure member 50 (i.e., the pressure nut). The pressure washer 70 includes a second expansion surface 72 and a non-threaded hole 74. The non-threaded hole 74 receives the externally threaded shaft 62 of the second pressure member 52 therethrough. The second expansion surface 72 is a conical surface in this embodiment. The second expansion surface 72 is inclined toward the center longitudinal axis A of the expander 34 as the second expansion surface 72 extends downward from a top axial end of the pressure washer 70 as seen in FIGS. 3 and 4. The second expansion surface 72 engages the second (upper) expansion surfaces 46b of the wedge blocks 46 to vary the effective diameter of the expander body 40. In particular, as the second pressure member 52 (i.e., the pressure bolt) is tightened, such that the first pressure member 50 (i.e., the pressure nut) moves up the externally threaded shaft 62 of the second pressure member 52, the first and second expansion surfaces 54 and 72 contact the first and second expansion surfaces 46a and 46b of the wedge blocks 46, respectively to squeeze the wedge blocks 46 radially outward against the interior surface 18a of the steerer tube 18. Thus, the first pressure member 50 (i.e., the pressure nut) and the pressure washer 70 get closer to each other in an axial direction of the expander body 40 such that the first and second expansion surfaces 54 and 72 force the expander body 40 toward the radially outward direction as the second pressure member 52 (i.e., the pressure bolt) is screwed into the threaded hole 56 of the first pressure member 50 (i.e., the pressure nut).

While in the illustrated embodiment, the first pressure member 50 is a pressure nut having a first expansion surface and the second pressure member 52 is a pressure bolt with a pressure washer having a second expansion surface, the expander 34 is not limited to this arrangement. For example, the expander 34 could be configured such that the pressure bolt includes a first expansion surface that contacting a first corresponding expansion surface of the expander body 40. In this case, the expander body 40 would be located between a first expansion surface of the pressure bolt and a second expansion surface of the pressure washer such that the pressure nut moves the pressure washer towards the first expansion surface of the pressure bolt. Thus, one of the pressure nut and the pressure bolt can includes a first expansion surface that contacts a first corresponding expansion surface of the expander body 40, and the pressure washer includes the second expansion surface that contacts a second corresponding expansion surface of the expander body 40.

Figure 6:
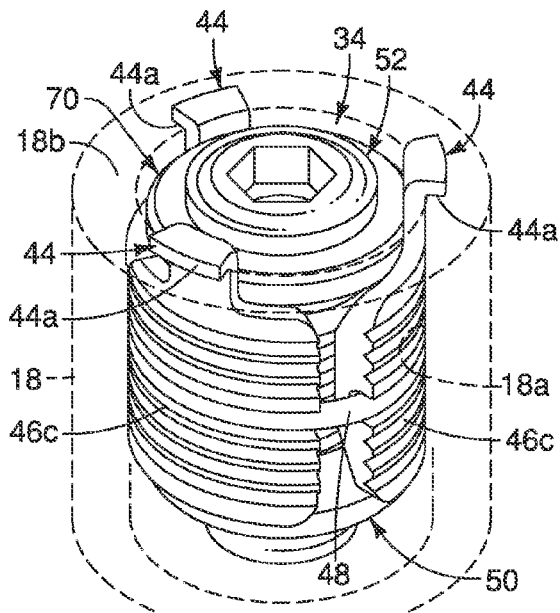
FIG. 6 is a perspective view of the bicycle expander illustrated in FIG. 5 shown installed in a first steerer tube.
Figure 7:
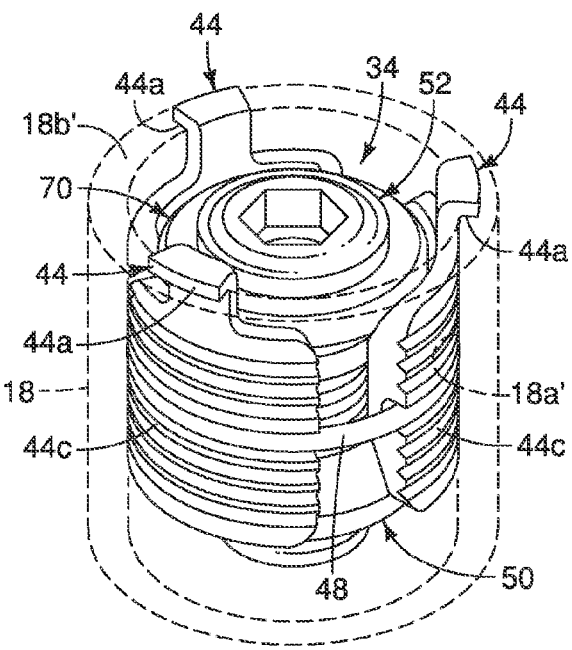
FIG. 7 is a perspective view of the bicycle expander illustrated in FIG. 5 shown installed in a second steerer tube that is larger than the first steerer tube.

Referring now to FIGS. 6 and 7, the expander 34 is illustrated as being used with the steerer tube 18 having a first internal diameter in FIG. 6, and the expander 34 is illustrated as being used with a steerer tube 18' having a second internal diameter in FIG. 7. The steerer tube 18 constitutes a first steerer tube and the steerer tube 18' constitutes a second steerer tube that has a larger internal diameter than the internal diameter of the first steerer tube 18. With the expander 34, as discussed above, the positioning shoulder 44 can be easily adjusted to engage either the upper edge 18b of the steerer tube 18 or an upper edge 18b' of the steerer tube 18'. This installation in either the steerer tube 18 or the steerer tube 18' can be easily accomplished because the positioning shoulder 44 is disposed on the wedge blocks 46, which adjust to the different internal diameters of the steerer tubes 18 and 18'. In this way, the expander 34 can be used with steerer tubes having an internal diameter within a prescribed range.

Figure 8:
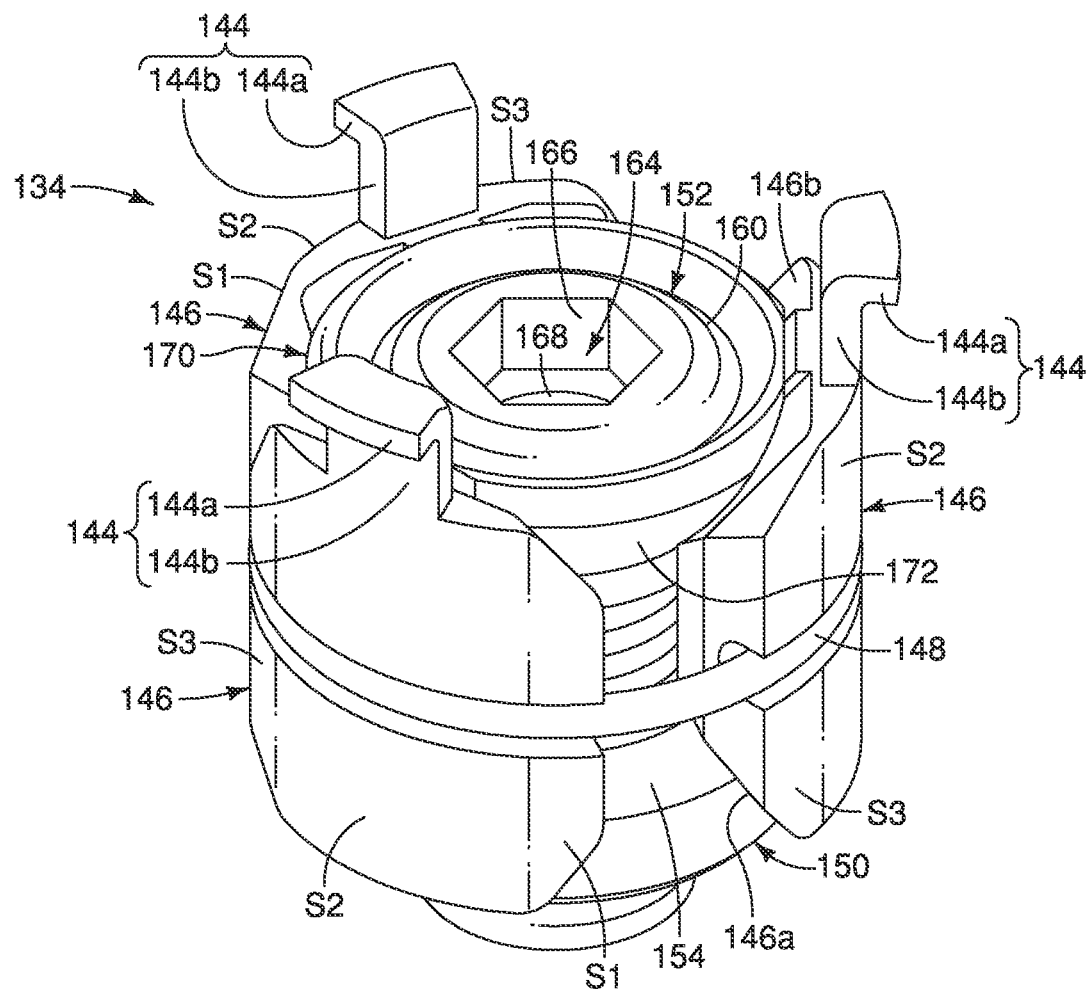
FIG. 8 is a perspective view of the bicycle expander in accordance with a second embodiment.
Figure 9:
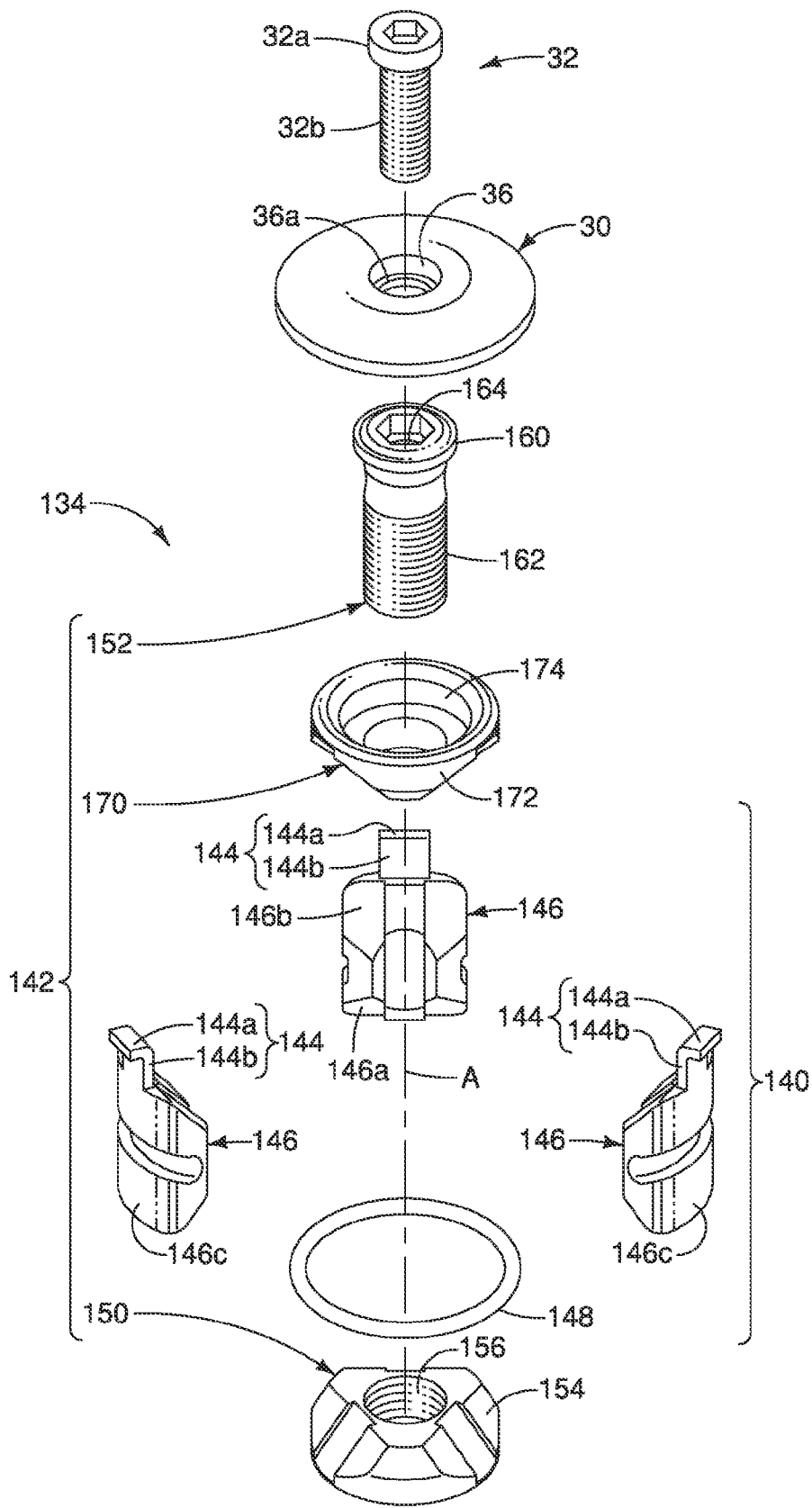
FIG. 9 is an exploded perspective view of the top cap bolt and the bicycle expander, which is illustrated in FIG. 8.
Figure 10:
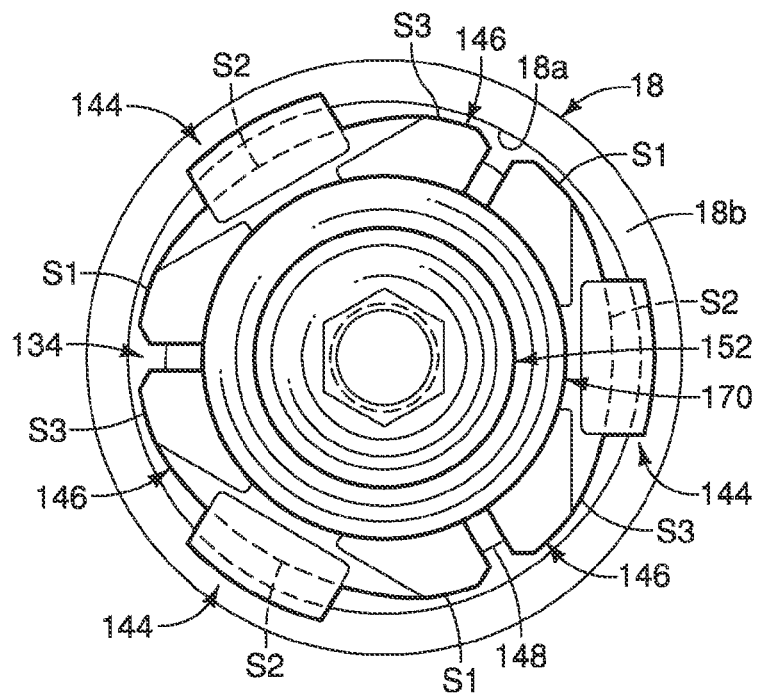
FIG. 10 is a top plan view of the bicycle expander illustrated in FIGS. 8 and 9 shown inserted into the first steerer tube, but prior to expansion of the bicycle expander.

Referring now to FIGS. 8 to 13, a bicycle expander 134 is illustrated in accordance with a second embodiment. As seen in FIGS. 8 and 9, the parts of expander 134 are basically the same as the parts of the expander 34, which are discussed above. However, as explained below, the expander 134 contacts the steerer tubes 18 and 18' in a different manner in this second embodiment than in the first embodiment. In view of the similarity between the first and second embodiments, the descriptions of the parts of the second embodiment that are identical in function to the parts of the first embodiment may be omitted or abbreviated for the sake of brevity.

As seen in FIG. 9, the expander 134 is used with the top cap 30 and the top cap bolt 32 of the first embodiment. The expander 134 basically includes an expander body 140 and an expanding structure 142. The expander body 140 of the expander 134 also is connected to a positioning shoulder 144. Similar to the first embodiment, as seen in FIGS. 10 to 13, the positioning shoulder 144 engages the upper edge 18b or 18b' of the steerer tube 18 or 18' to hold the expander 134 in position while the expander 134 is being expanded against the interior surface 18a or 18a' of the steerer tube 18. The expander body 140 preferably further includes three wedge blocks 146 and an elastic band 148, similar to the first embodiment.

The expanding structure 142 basically includes a first pressure member 150 (i.e., a pressure nut), a second pressure member 152 (i.e., a pressure bolt) and a third pressure member 170 (i.e., a pressure washer). The first pressure member 150 has a first expansion surface 154 and a threaded hole 156. The second pressure member 152 has a head 160, an externally threaded shaft 162 and a longitudinally extending bore 164. The bore 164 defines a tool engagement portion 166 and an internally threaded portion 168 (see FIG. 8). The third pressure member 170 includes a second expansion surface 172 and a non-threaded hole 174. The second pressure member 152 is identical to the second pressure member 52, as discussed above, while the first and third pressure members 150 and 170 have been modified relative to the first and third pressure members 50 and 70 to cooperate with the modifications to the wedge blocks 146, as discussed below. Specifically, the first and second expansion surfaces 154 and 172 are each formed of three separate inclined surfaces that include a guide channel in each of the inclined surfaces.

Here, in this second embodiment, each of the wedge blocks 146 is connected to the positioning shoulder 144. Stated differently, the positioning shoulder 144 is partially formed by each of the wedge blocks 146, similar to the first embodiment. Thus, the positioning shoulder 144 is formed by a plurality of abutments 144a and a plurality of connecting portions 144b connecting the abutments 144a with each of the wedge blocks 146. Each of the wedge blocks 146 includes a first or lower expansion surface 146a, a second or upper expansion surface 146b and an outer peripheral surface 146c. In the second illustrated embodiment, the wedge blocks 146 are identical to the wedge blocks 46, except that the shapes of the surfaces 146a, 146b and 146c of the wedge blocks 146 have been modified. Specifically, the first and second expansion surfaces 146a and 146b are each formed of three separate inclined surfaces that include a guide channel in each of the inclined surfaces. The first expansion surface 146a mates with the first expansion surface 154 of the first pressure member 150, while the second expansion surface 146b mates with the second expansion surface 172 of the third pressure member 170. Moreover, while the outer peripheral surfaces 146c are shown as being smooth, each of the outer peripheral surfaces 146c preferably has a plurality of circumferentially extending grooves, similar to the first embodiment. The grooves on the outer peripheral surfaces 146c have been mainly omitted for the sake of clarity in illustrating the features of the wedge blocks 146. Of course, if needed and/or desired, the outer peripheral surfaces 146c can be formed without such grooves.

The outer peripheral surface 146c of each of the wedge blocks 146 includes a three tube contact areas S1, S2 and S3. Preferably, the tube contact areas S1, S2 and S3 are each partially cylindrical surfaces. The tube contact areas S1 and S3 constitute a plurality of first tube contact areas of the expander body 40, while the tube contact areas S2 constitute a plurality of second tube contact areas of the expander body 40. Thus, in this second embodiment, a total number of the first tube contact areas S1 and S3 is greater than a total number of the second tube contact areas S2. Specifically, the total number of the first tube contact areas S1 and S3 is twice the total number of the second tube contact areas S2, in this second embodiment. For each of the wedge blocks 146, the second tube contact area S2 is preferably disposed between the first tube contact areas S1 and S3 with respect to a circumferential direction of the outer peripheral surface 146c of the wedge blocks 146 of the expander body 40. Preferably, the first tube contact areas S1 and S3 of each of the wedge blocks 146 are partially cylindrical surfaces having a common center of curvature. More preferably, the first tube contact areas S1 and S3 of each of the wedge blocks 146 have a radius of curvature that is smaller than a radius of curvatures of the first tube contact areas S1 and S3.

Figure 11:
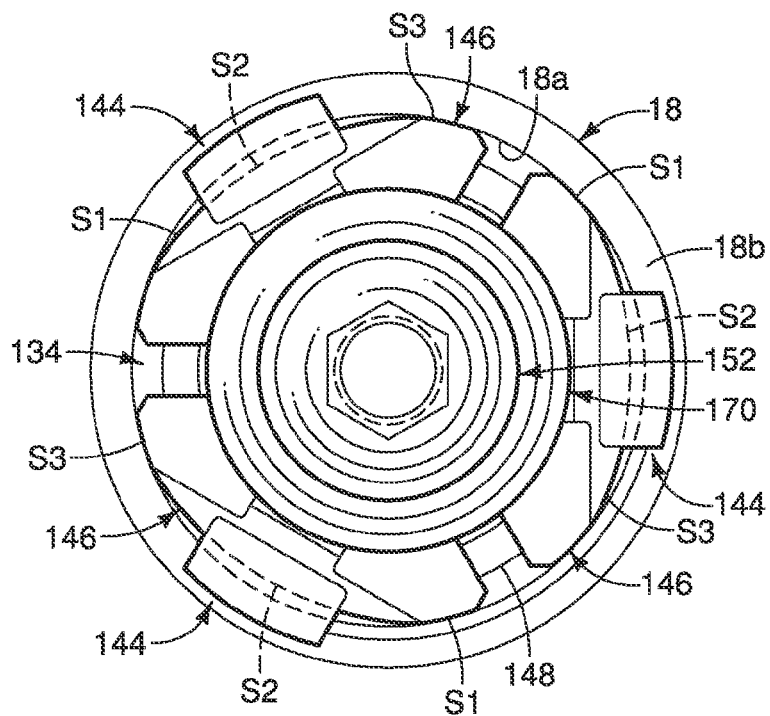
FIG. 11 is a top plan view of the bicycle expander installed in the first steerer tube as illustrated in FIG. 10, but after expansion of the bicycle expander.
Figure 12:
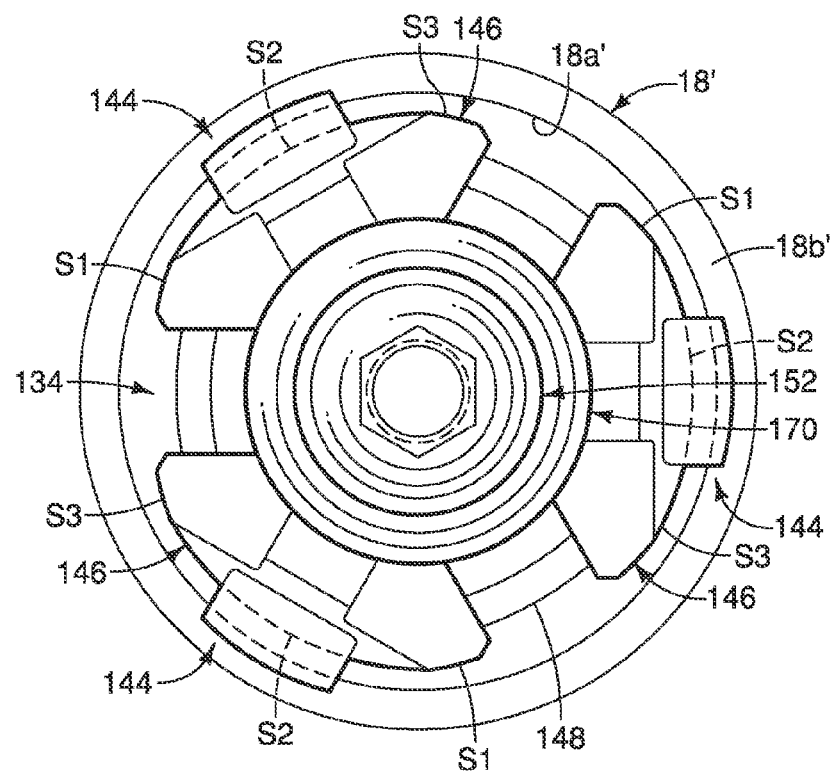
FIG. 12 is a top plan view of the bicycle expander illustrated in FIGS. 8 and 9 shown inserted in the second steerer tube, but to expansion of the bicycle expander.
Figure 13:
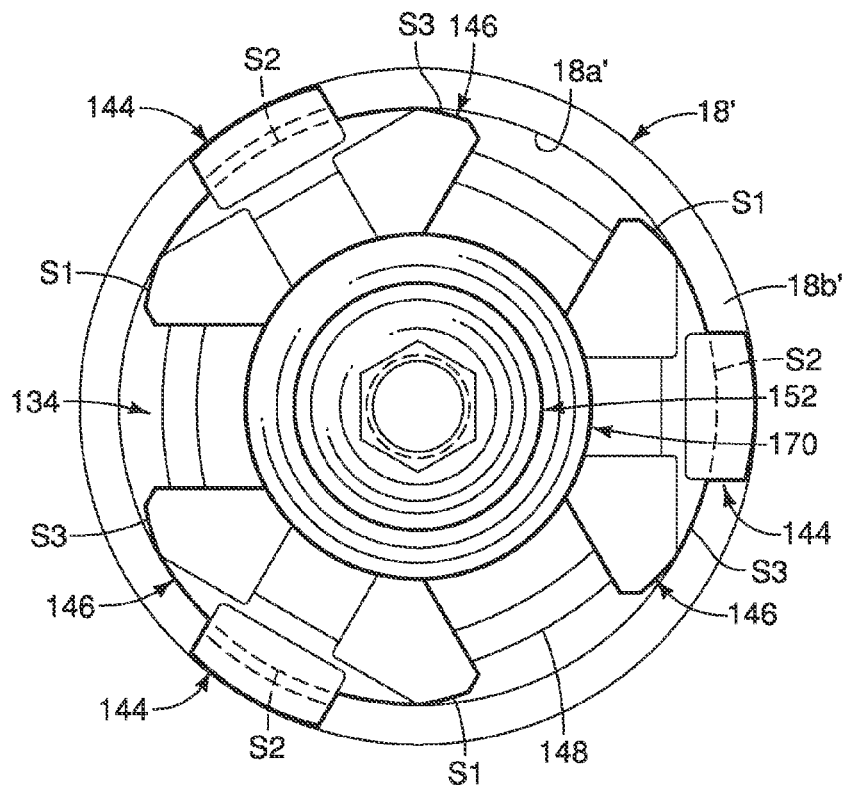
FIG. 13 is a top plan view of the bicycle expander installed in the second steerer tube as illustrated in FIG. 12, but after expansion of the bicycle expander.

The first tube contact areas S1 and S3 are arranged to contact the interior surface 18a (i.e., an inner circumferential surface) of the steerer tube 18 (i.e., a first tube having a first prescribed inner diameter) while the expander 134 is installed in the steerer tube 18 (i.e., the first tube) as seen in FIG. 11. The second tube contact areas S2 are arranged to contact the interior surface 18a' (i.e., an inner circumferential surface) of the steerer tube 18' (i.e., a second tube having a second prescribed inner diameter) while the expander 134 is installed in the steerer tube 18' (i.e., the second tube) as seen in FIG. 13. As seen in FIGS. 10 to 13, the first prescribed inner diameter of the steerer tube 18 is smaller than the second prescribed inner diameter of the steerer tube 18'.

Thus, as seen in FIG. 11, the first tube contact areas S1 and S3 of each of the wedge blocks 146 contacts the interior surface 18a of the steerer tube 18 and the second tube contact areas S2 are spaced inward from the interior surface 18a of the steerer tube 18. This situation occurs because the first internal diameter of the steerer tube 18 has a radius of curvature that matches the radius of curvatures of the first tube contact areas S1 and S3 or that is within a prescribed range that corresponds to the radius of curvatures of the first tube contact areas S1 and S3. On the other hand, as seen in FIG. 13, the second tube contact areas S2 of each of the wedge blocks 146 contacts the interior surface 18a' of the steerer tube 18' and the first tube contact areas S1 and S3 are spaced inward from the interior surface 18a' of the steerer tube 18'. This situation occurs because the second internal diameter of the steerer tube 18' has a radius of curvature that matches the radius of curvatures of the second tube contact areas S2 or that is within a prescribed range that corresponds to the radius of curvatures of the second tube contact areas S2.

Figure 14:
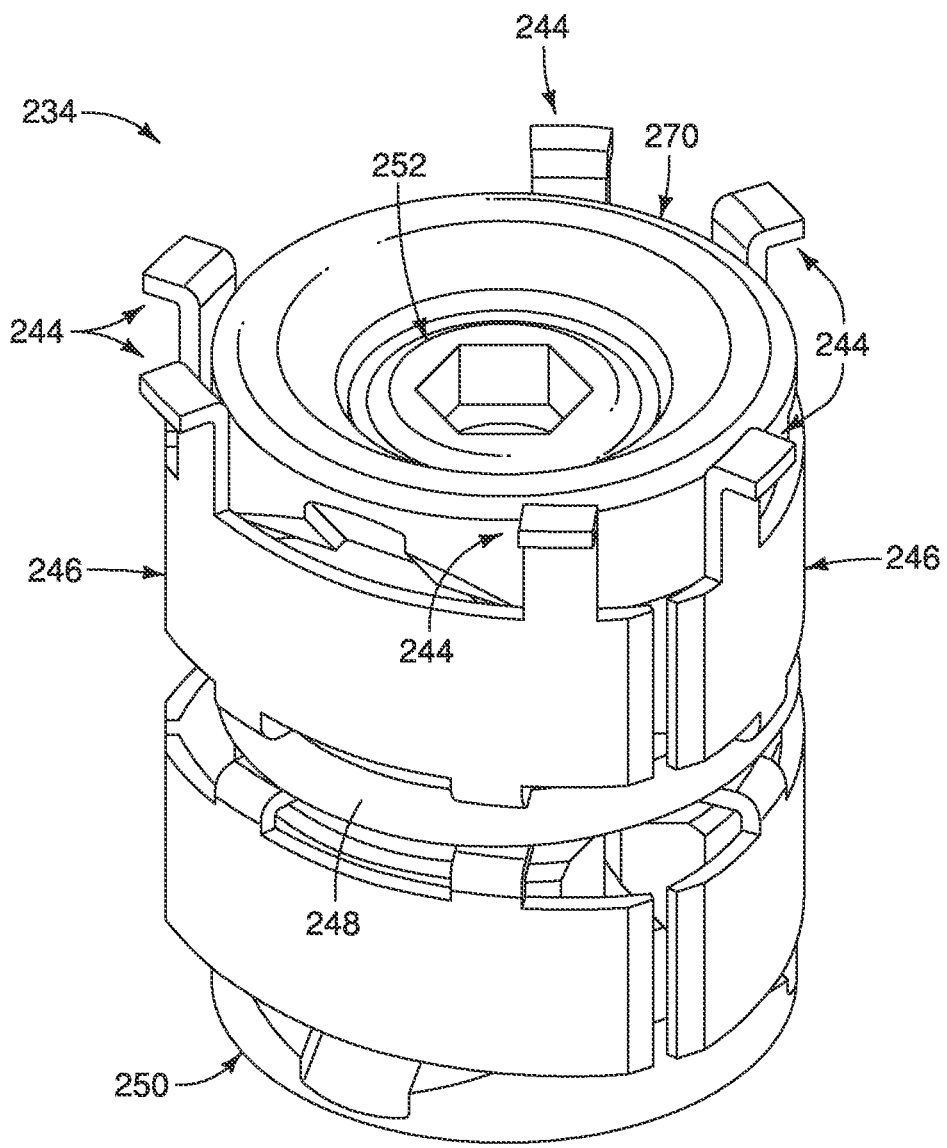
FIG. 14 is a perspective view of a bicycle expander in accordance with a third embodiment.
Figure 15:
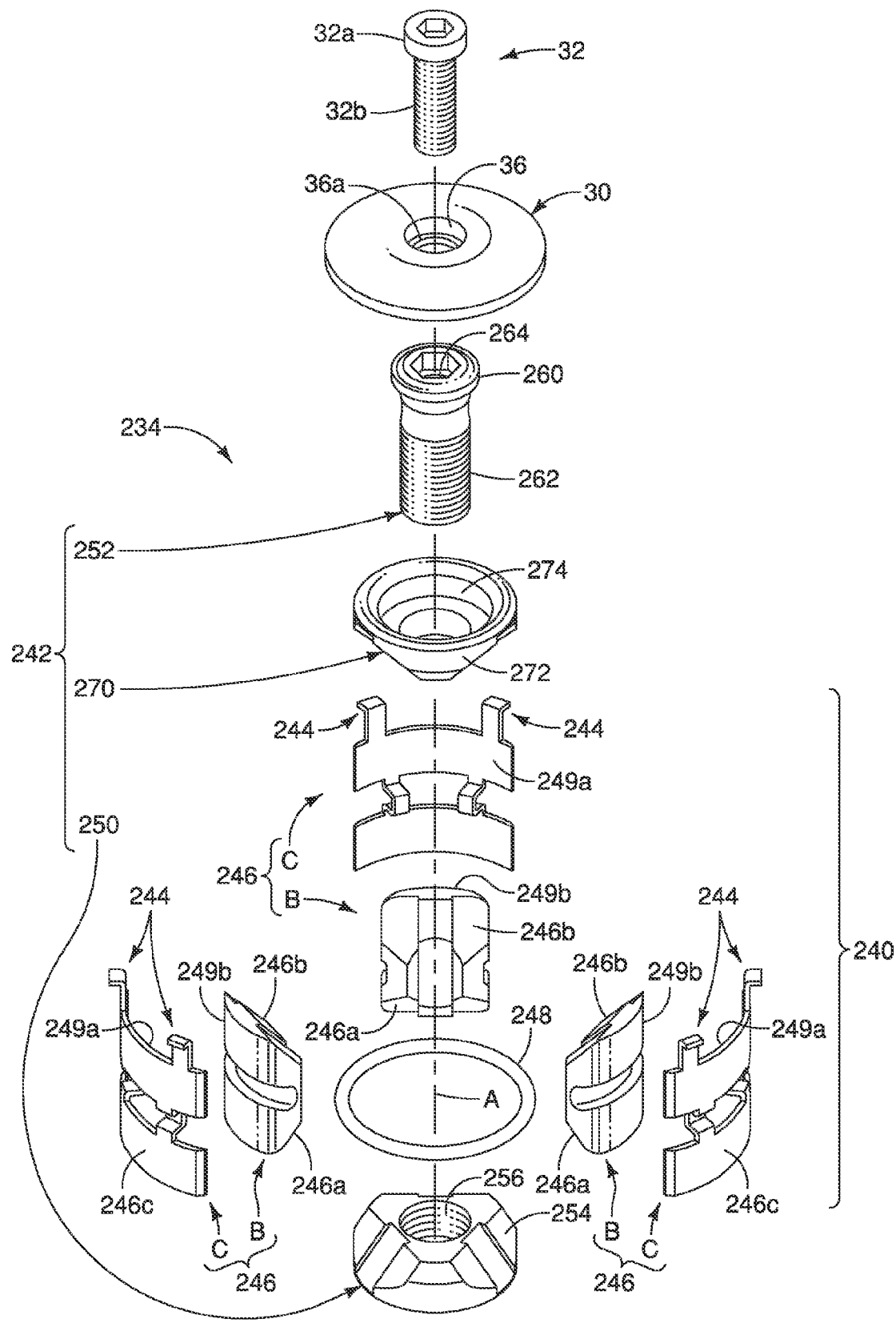
FIG. 15 is an exploded perspective view of the top cap bolt and the bicycle expander, which is illustrated in FIG. 14.
Figure 16:
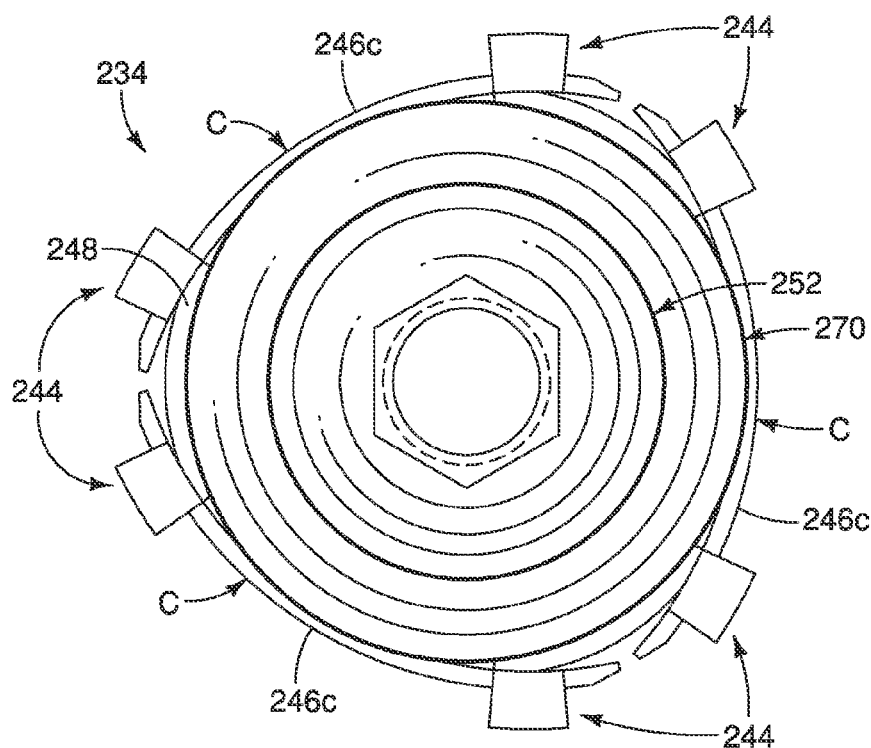
FIG. 16 is a top plan view of the bicycle expander illustrated in FIGS. 14 and 15.
Figure 17:
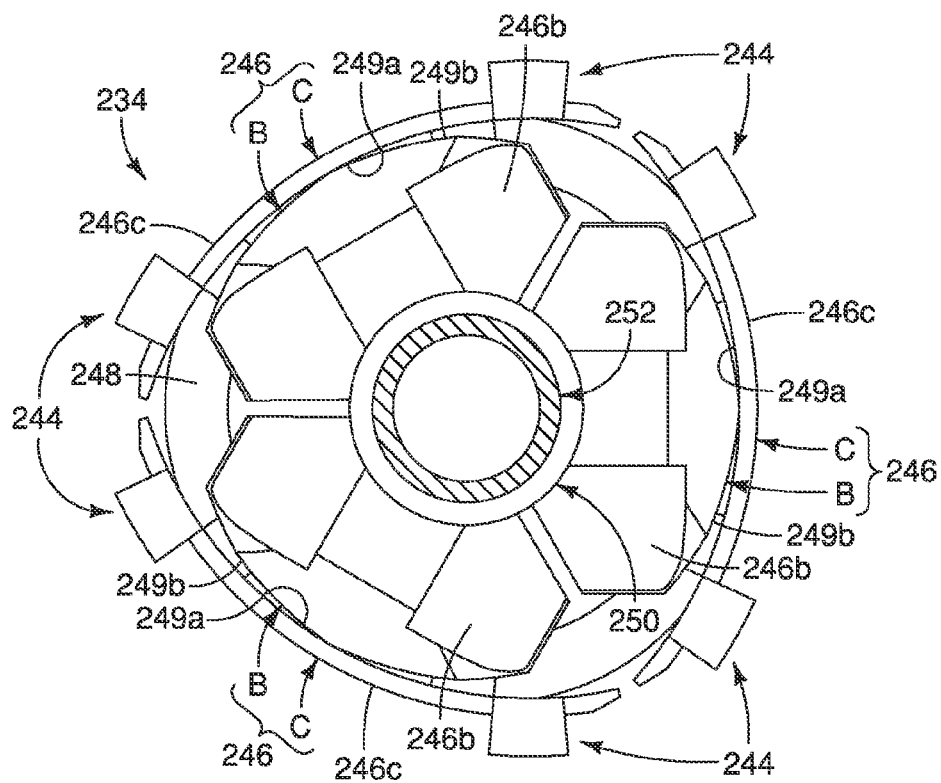
FIG. 17 is a top plan view of the bicycle expander illustrated in FIGS. 14 to 16, but with the pressure washer and the second pressure member (i.e., the pressure bolt) removed.
Figure 18:
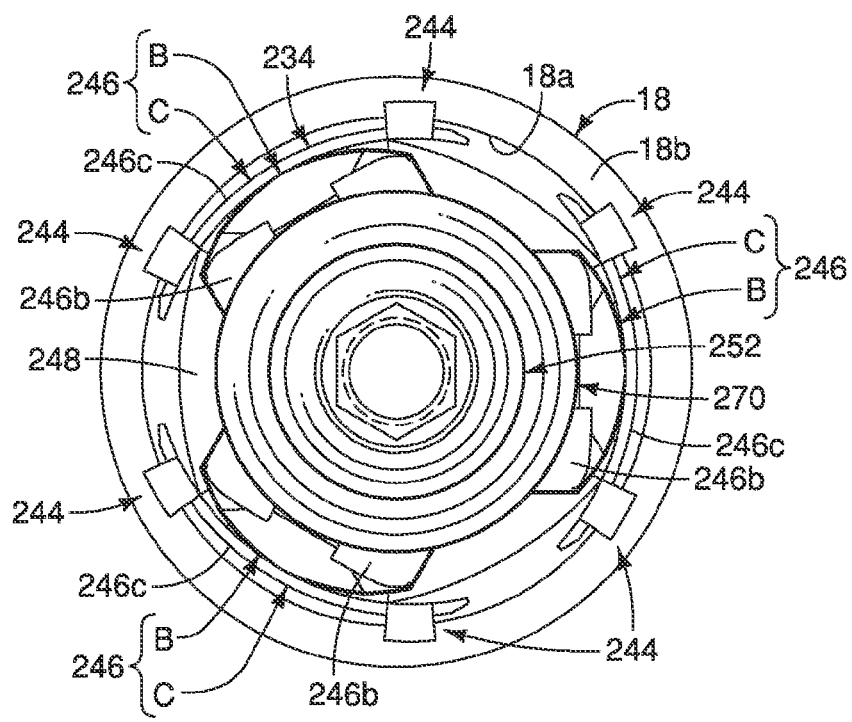
FIG. 18 is a top plan view of the bicycle expander illustrated in FIGS. 14 to 16 shown inserted in the first steerer tube.
Figure 19:
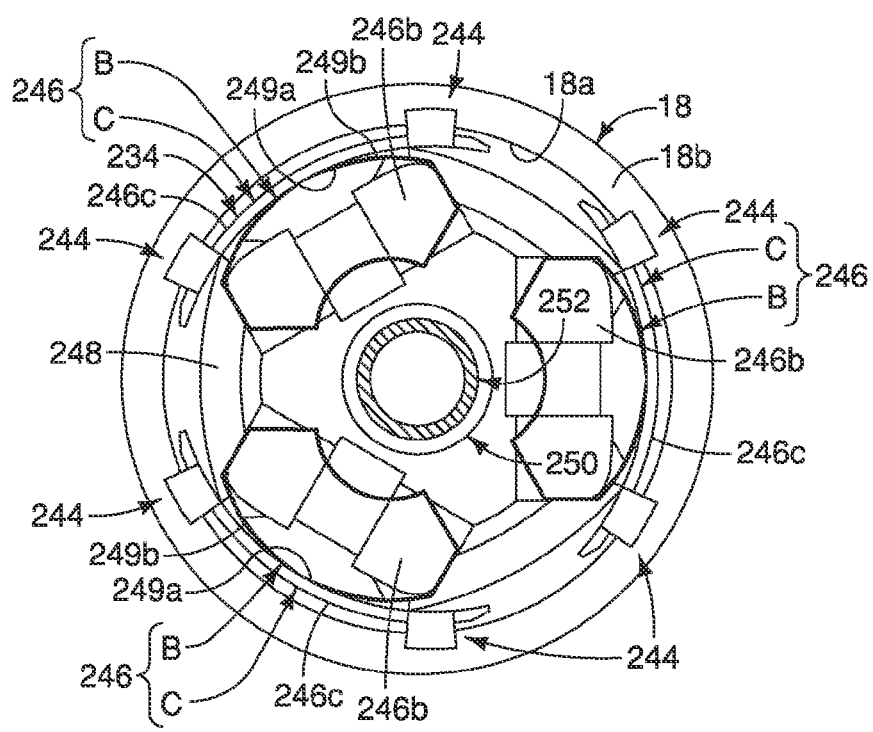
FIG. 19 is a top plan view of the bicycle expander illustrated in FIG. 18, but with the pressure washer and the second pressure member (i.e., the pressure bolt) removed.
Figure 20:
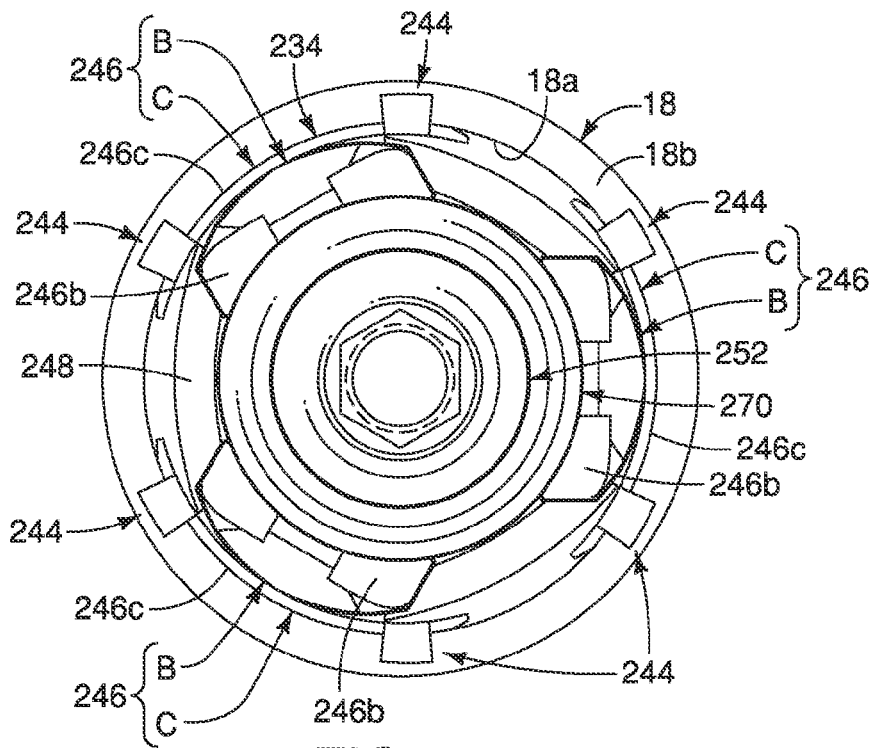
FIG. 20 is a top plan view, similar to FIG. 18, of the bicycle expander but after expansion of the bicycle expander in the first steerer tube.
Figure 21:
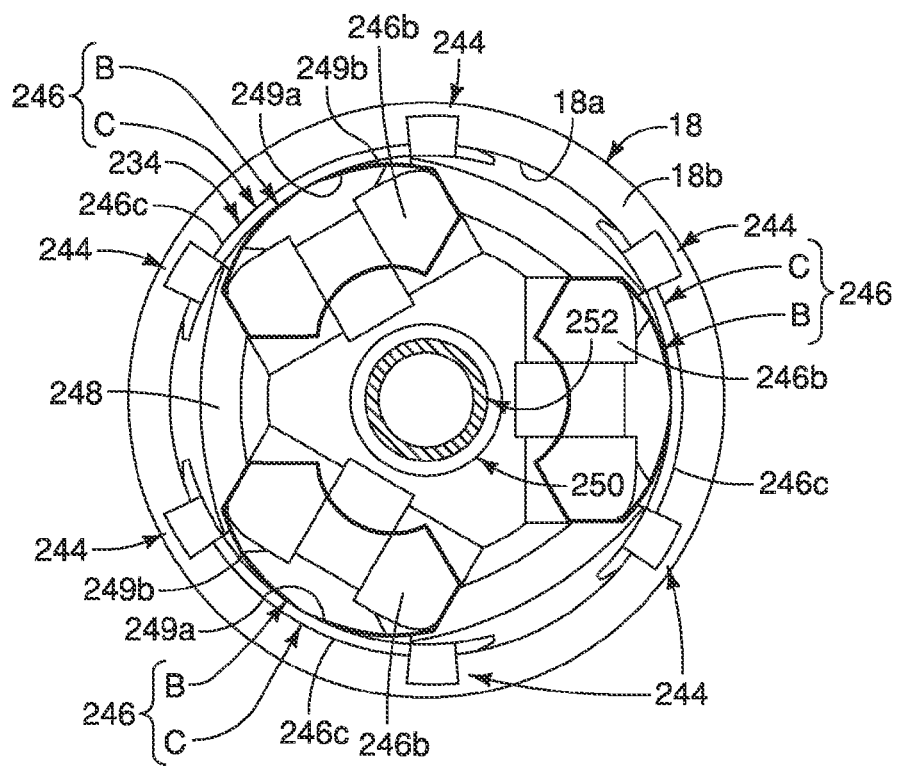
FIG. 21 is a top plan view, similar to FIG. 18, of the bicycle expander but after expansion of the bicycle expander in the first steerer tube and with the pressure washer and the second pressure member (i.e., the pressure bolt) removed.
Figure 22:
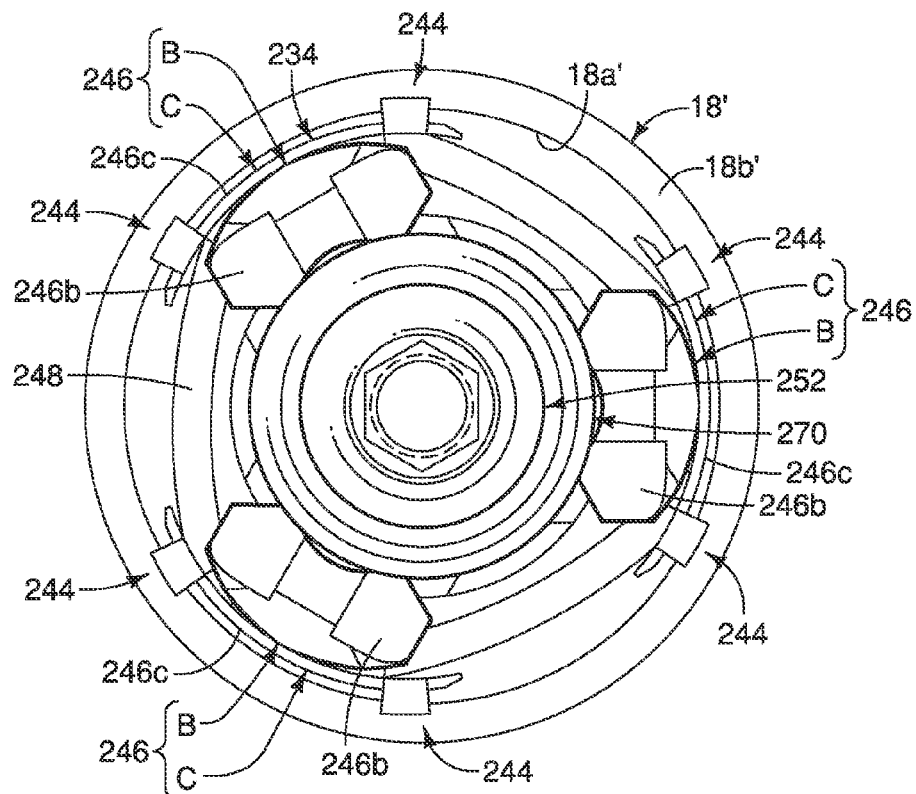
FIG. 22 is a top plan view of the bicycle expander illustrated in FIGS. 14 to 16 shown inserted in the second steerer tube.
Figure 23:
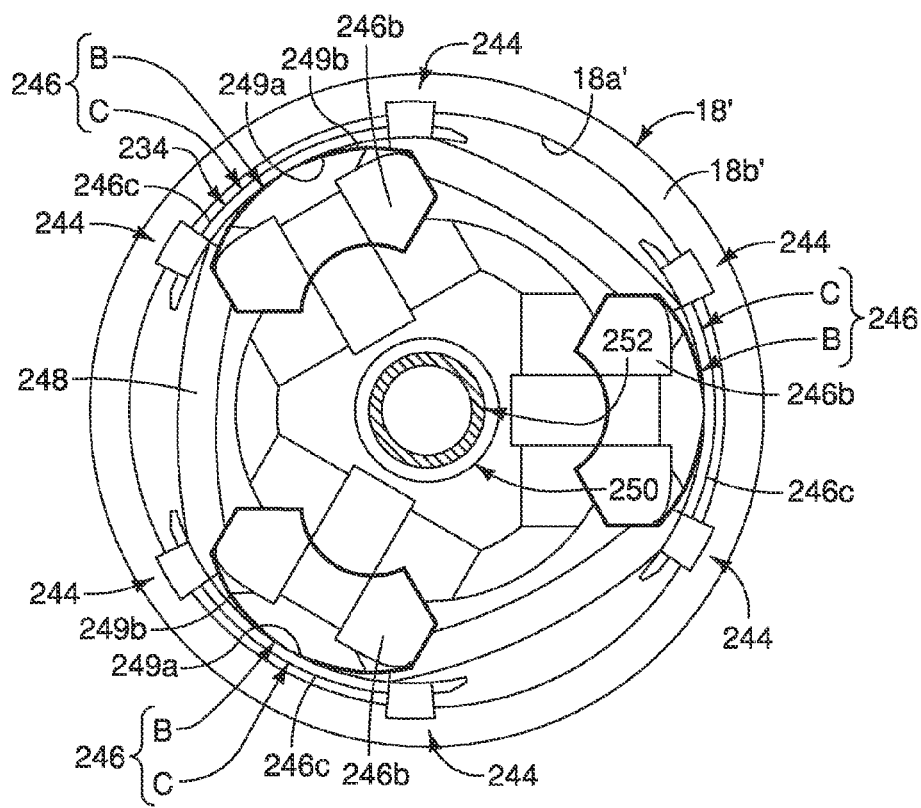
FIG. 23 is a top plan view of the bicycle expander illustrated in FIG. 22, but with the pressure washer and the second pressure member (i.e., the pressure bolt) removed.
Figure 24:
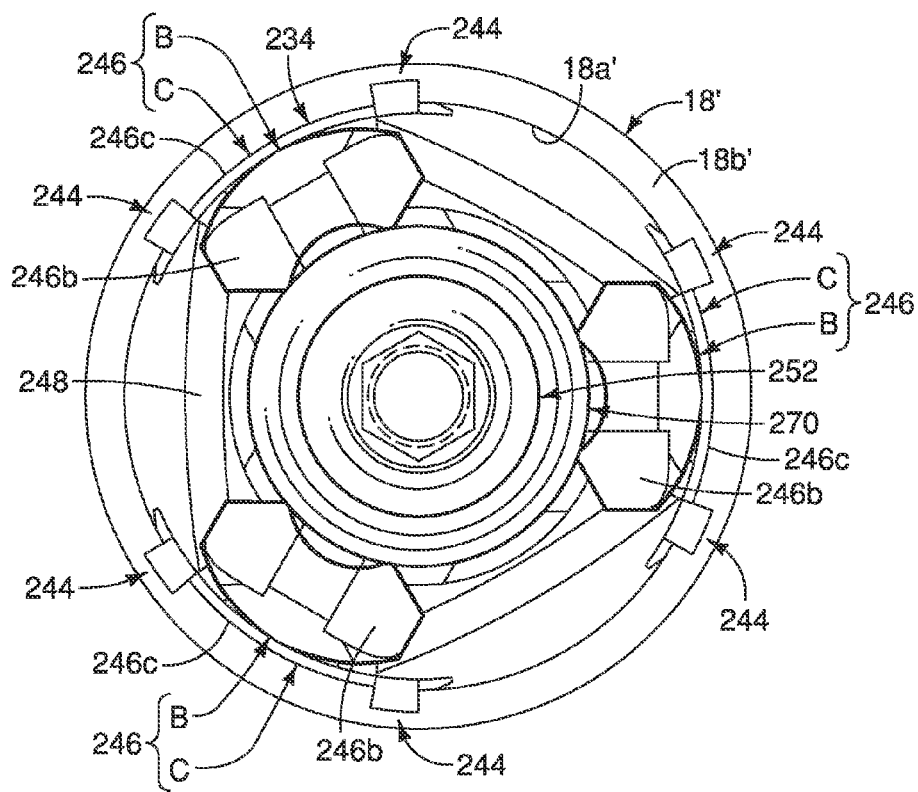
FIG. 24 is a top plan view, similar to FIG. 22, of the bicycle expander but after expansion of the bicycle expander in the second steerer tube.
Figure 25:
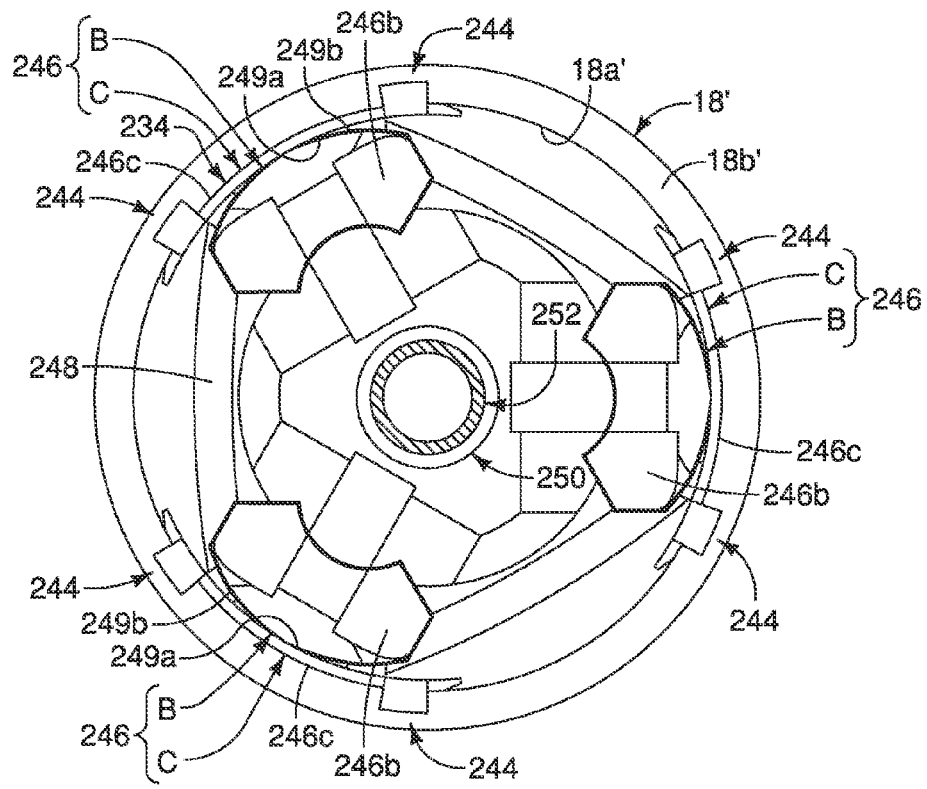
FIG. 25 is a top plan view, similar to FIG. 22, of the bicycle expander but after expansion of the bicycle expander in the second steerer tube and with the pressure washer and the second pressure member (i.e., the pressure bolt) removed.

Referring now to FIGS. 14 to 25, a bicycle expander 234 is illustrated in accordance with a third embodiment. As seen in FIGS. 14 and 15, the parts of expander 234 are basically the same as the parts of the expander 34, which are discussed above. However, as explained below, the expander 234 contacts the steerer tubes 18 and 18' in a different manner in this third embodiment than in the first embodiment. In view of the similarity between the first and third embodiments, the descriptions of the parts of the third embodiment that are identical in function to the parts of the first embodiment may be omitted or abbreviated for the sake of brevity.

As seen in FIG. 15, the expander 234 is used with the top cap 30 and the top cap bolt 32 of the first embodiment. The expander 234 basically includes an expander body 240 and an expanding structure 242. The expander body 240 of the expander 234 also includes a positioning shoulder 244. Similar to the first embodiment, as seen in FIGS. 18 to 25, the positioning shoulder 244 engages the upper edge 18b or 18b' of the steerer tube 18 or 18' to hold the expander 234 in position while the expander 234 is being expanded against the interior surface 18a or 18a' of the steerer tube 18 or 18a'. The expander body 240 preferably further includes three wedge blocks 246 and an elastic band 248.

As seen in FIGS. 14 and 15, the expanding structure 242 basically includes a first pressure member 250 (i.e., a pressure nut), a second pressure member 252 (i.e., a pressure bolt) and a third pressure member 270 (i.e., a pressure washer). The first pressure member 250 has a first expansion surface 254 and a threaded hole 256. The second pressure member 252 has a head 260, an externally threaded shaft 262 and a longitudinally extending bore 264. The third pressure member 270 includes a second expansion surface 272 and a non-threaded hole 274. The first, second and third pressure members 250, 252 and 270 are identical to the first, second and third pressure members 150, 152 and 170, as discussed above.

As best seen in FIGS. 14, 15, 17, 19, 21, 23 and 25, in this embodiment, each of the wedge blocks 246 is made of two parts. In particular, each of the wedge blocks 246 includes a wedge body B and a body cover C. The wedge body B is a hard rigid member, while the body cover C is a resilient member that bends when installed in one of the steerer tube 18 or 18'. While the illustrated embodiment utilizes three of the wedge bodies B and three of the body covers C, the expander body 240 can include other configurations. Preferably, the expander body 240 includes at least two of the wedge bodies D and at least two of the body covers C. Also preferably, the positioning shoulder 244 is part of one or more of the body covers C.

Each of the wedge bodies B includes a first or lower expansion surface 246a and a second or upper expansion surface 246b, while each of the body covers C includes an outer peripheral surface 246c that forms a part of the outer peripheral surface of the expander body 240. Thus, the outer peripheral surfaces 246c constitute a tube contact surface of the expander body 240. Generally, each of the outer peripheral surfaces 246c is a partially cylindrical surface with a recess for receiving a portion of the elastic band 248. The body covers C are shown in a non-deformed (unstressed state or preformed state at rest) in FIGS. 14 to 19, 22 and 23. The body covers C are preferably resiliently deformed when installed in one of the steerer tubes 18 and 18a' in FIGS. 20, 21, 24 and 25.

Basically, each of the body covers C further includes an internal surface 249a that contacts an outer peripheral surface 249b of one the wedge bodies B. Thus, the internal surfaces 249a of the body covers C at least partially overlie the outer peripheral surfaces 249b of the wedge blocks 46 respectively. The internal surfaces 249a are each partially cylindrical surfaces with a first prescribed radius of curvature (i.e., a first curvature radius). The outer peripheral surfaces 249b are each partially cylindrical surfaces having a second prescribed radius of curvature (i.e., a second curvature radius). The second curvature radius of each of the outer peripheral surfaces 249b of the wedge bodies B is smaller than the first curvature radius of the corresponding one of the internal surfaces 249b of the body covers C in its non-deformed state. In other words, the internal surface 249a has a non-deformed curvature that has a radius of curvature which is preferably larger than the radius of curvatures of the outer peripheral surfaces 249b of the wedge bodies B. Also each of the outer peripheral surfaces 246c of the body covers C preferably has a radius of curvature which is preferably larger than the radius of curvature of the steerer tubes 18 and 18a' of the steerer tube 18 or 18'.

During installation of the expander 234 into one of the steerer tubes 18 and 18a', first, the expander body 240 is expanded by tightening the second pressure member 252 to a dimension in which the positioning shoulder 244 rests upon the upper edge 18b or 18b' of the steerer tube 18 or 18' to hold the expander 234 in position as seen in FIGS. 18, 19, 22 and 23. The expander body 240 is further expanded by tightening the second pressure member 252 such that the circumferential ends of the body covers C first contact the interior surface 18a or 18a' of the steerer tube 18 or 18' while the middle section of the body covers C are spaced from the interior surface 18a or 18a' of the steerer tube 18 or 18'. Then, as the expander body 240 is further expanded by tightening the second pressure member 252, the wedge blocks 246 are pushed radially outward against the interior surface 18a or 18a' of the steerer tube 18 or 18'. As a result of this contact of the body covers C against the interior surface 18a or 18a', the body covers C are bent against the outer peripheral surfaces 249b of the wedge bodies B. More specifically, the internal surfaces 249b of the body covers C contact the outer peripheral surfaces 249b of the wedge bodies B, respectively, such that the body covers C are bent against the outer peripheral surfaces 249b of the wedge bodies B to reduce the radius of curvature of each of body covers C. Thus, upon installation of the expander 234 into one of the steerer tubes 18 and 18a', the body covers C deform so that the outer peripheral surfaces 246c of the body covers C match the curvature of the interior surface 18a or 18a' of the steerer tube 18 or 18' as seen in FIGS. 20, 21, 24 and 25 to provided full contact therebetween. In other words, upon installation of the expander 234 into one of the steerer tubes 18 and 18a', the outer peripheral surfaces 249b of the wedge bodies B supports the body covers C for deforming from the non-deformed curvature (FIGS. 14 to 19, 22 and 23) to an installed curvature (FIGS. 20, 21, 24 and 25) having a smaller curvature radius than a curvature radius of the non-deformed curvature. Thus, upon fully tighten of the second pressure member 252, the body covers C gradually deform outward, until full surface contact is made against the interior surface 18a or 18a' of the steering tube 18 or 18'. This large contact area helps increase holding strength of expander 234. Therefore, the expander 234 can be used with any steerer tube having an internal diameter within a prescribed range between a maximum diameter specification and a minimum diameter specification.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms "first", "second" and "third" may be used herein to describe various components, these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Furthermore, terms of degree such as "substantially", "about" and "approximately" as used herein mean an amount of deviation of the modified term such that the end result is not significantly changed.

Finally, the term "connect" or "connected", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e. one element is unitary part of the other element. For example, the wedge block or the body cover can be directly secured to the positioning shoulder, or can be indirectly secured to the positioning shoulder through intermediate member(s), or can be integral with the positioning shoulder. This definition also applies to words of similar meaning, for example, the terms "attach", "attached", "join", "joined", "fix", "fixed", "bond", "bonded", "couple", "coupled" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle expander comprising:
an expander body having a cylindrical shape and being capable of varying an effective diameter thereof the expander body including at least two wedge blocks that are separate members;
an expanding structure operatively connected to the expander body to vary the effective diameter of the expander body; and
a positioning shoulder extending from an axial end portion of the expander body, the positioning shoulder including a plurality of abutments, at least two of the wedge blocks has at least one of the abutments protruding in a radially outward direction with respect to the expander body.

2. The bicycle expander according to claim 1, wherein the positioning shoulder further includes a connecting portion connecting the abutment with the expander body.

3. The bicycle expander according to claim 2, wherein the connecting portion extends to parallel to an axial direction of the expander body.

4. The bicycle expander according to claim 1, wherein the positioning shoulder includes a plurality of connecting portions, each of the wedge blocks is connected to one of the connecting portions.

5. The bicycle expander according to claim 1, wherein the expander body includes an elastic band biasing the wedge blocks toward a radially inward direction of the expander body.

6. The bicycle expander according to claim 1, wherein the expanding structure includes a first pressure member and a second pressure member, the second pressure member moves with respect to the first pressure member to vary the effective diameter of the expander body.

7. The bicycle expander according to claim 6, wherein the first pressure member is provided as a pressure nut having a threaded hole, and the second pressure member is provided as a pressure bolt screwed into the threaded hole of the pressure nut.

8. The bicycle expander according to claim 7, wherein the pressure nut is engaged with the expander body to vary the effective diameter of the expander body.

9. The bicycle expander according to claim 1, wherein the expander body includes an outer peripheral surface having a plurality of first tube contact areas arranged to contact an inner circumferential surface of a first tube having a first prescribed inner diameter while the bicycle expander is installed in the first tube, and the expander body includes a plurality of second tube contact areas arranged to contact an inner circumferential surface of a second tube having a second prescribed inner diameter while the bicycle expander is installed in the second tube,
the first prescribed inner diameter being smaller than the second prescribed inner diameter, a total number of the first tube contact areas being greater than a total number of the second tube contact areas.

10. The bicycle expander according to claim 9, wherein the total number of the first tube contact areas is twice the total number of the second tube contact areas.

11. The bicycle expander according to claim 1, wherein each of the wedge blocks includes at least of one of each of the first tube contact areas and the second tube contact areas.

12. The bicycle expander according to claim 11, wherein each of the wedge blocks includes two of the first tube contact areas and one of the second tube contact area.

13. The bicycle expander according to claim 12, wherein the second tube contact area is disposed between the two of the first tube contact areas with respect to a circumferential direction of the outer peripheral surface of the expander body.

14. A bicycle expander comprising:
an expander body having a cylindrical shape;
an expanding structure operatively connected to the expander body to vary the effective diameter of the expander body, the expanding structure having a first pressure member and a second pressure member, the second pressure member moves with respect to the first pressure member to vary the effective diameter of the expander body, the first pressure member being provided as a pressure nut having a threaded hole to engage with the expander body to vary the effective diameter of the expander body, and the second pressure member is provided as a pressure bolt screwed into the threaded hole of the pressure nut;

a pressure washer disposed on the pressure bolt between a head of the pressure bolt and the pressure nut, one of the pressure nut and the pressure bolt including a first expansion surface contacting a first corresponding expansion surface of the expander body, the pressure washer including a second expansion surface contacting a second corresponding expansion surface of the expander body, the one of the pressure nut and the pressure bolt gets closer to the pressure washer in an axial direction of the expander body such that the first and second expansion surfaces force the expander body toward a radially outward direction with respect to the expander body as the pressure bolt is screwed into the threaded hole of the pressure nut; and a positioning shoulder extending from an axial end portion of the expander body, the positioning shoulder including an abutment protruding in the radially outward direction.

15. The bicycle expander according to claim 14, wherein the pressure nut includes the first expansion surface and gets closer to the pressure washer as the pressure bolt is screwed into the threaded hole of the pressure nut.

* * * * *